3,813,252
SINTERED REFRACTORY MATERIAL

Alfred Lipp, Leubas, St. Mang, Germany, assignor to Elektroschmelzwerk Kempten GmbH, Munich, West Germany
No Drawing. Continuation-in-part of application Ser. No. 755,503, Aug. 19, 1968, which is a continuation of application Ser. No. 570,756, Aug. 8, 1966. This application Oct. 27, 1969, Ser. No. 869,925
Claims priority, application Germany, Aug. 11, 1965, E 29,885
Int. Cl. C04b 35/66; H01b 1/06
U.S. Cl. 252—520           6 Claims

ABSTRACT OF THE DISCLOSURE

The present invention relates to formed refractory articles of increased machinability prepared by including 10–20%, by weight, of boron nitride in refractories comprising a mixture of a material selected from the group consisting of aluminum nitride, silicon nitride, and aluminum boride and an electrically conductive material selected from the group consisting of graphite, boron carbide titanium carbide, zirconium carbide, chromium carbide, silicon carbide, titanium boride, zirconium boride, chromium boride, silicon boride, beryllium boride and calcium boride.

---

The present invention relates to sintered refractory materials. More particularly, it relates to machinable sintered refractory materials containing aluminum nitride or silicon nitride or preferably aluminum boride and an electrically conductive material which has been rendered machinable by the inclusion of 10–20%, by weight, of boron nitride, and to articles made from same, useful in the vaporization of metals.

This application is a continuation-in-part of application Ser. No. 755,503, filed Aug. 19, 1968, which application was in turn a continuation of application Ser. No. 570,756, filed Aug. 8, 1966, both applications now abandoned.

Refractory materials, and particularly, shaped refractory materials, find many uses in the arts and many methods have been suggested for the preparation of such articles for various uses. Such materials, however, have been deficient in one or more properties either essential or desirable. Among these is high stability under the conditions of use so that frequent stoppages of the operation are not required either to repair or replace the article. For many uses it is desirable that the articles be electrically conductive and that they not be reactive under conditions of use with the materials with which they come in contact. They should be able to withstand shocks incurred from reasonable handling and from wide changes in temperatures. Many refractory articles cannot be completely fabricated in the form in which they are to be used and thus require machining before they can be used. Because of the inherent character of most refractory materials this is frequently impossible or accomplished only with great difficulty and expense. For this reason suitable refractory articles for many uses have not been readily available in the past. Applicant's refractory articles can be readily machined with conventional equipment and thus constitute an important advance over the prior art in this respect and at the same time possess the other properties essential to refractory articles required for general use in the arts.

In accordance with the present invention, machinable refractory articles are produced by incorporating 10–20%, by weight, of boron nitride (based on the weight of the article) into a refractory comprising aluminum nitride, or silicon nitride, or preferably aluminum boride, rendered electrically conductive by the presence of an electrically conductive material selected from the group consisting of graphite, boron carbide, titanium carbide, zirconium carbide, chromium carbide, silicon carbide, titanium boride, zirconium boride, chromium boride, silicon boride, beryllium boride, magnesium boride and calcium boride, the ratio of refractory material to electrically conductive material being preferably 20–80%, by weight, of the former to 80–20%, by weight of the latter.

In preparing the machinable refractory articles of the present invention the operation is carried out most effectively when using the various ingredients in a particular particle size range, that of the refractory material being from 40 to 5 microns, and preferably of the order of 15 microns for aluminum nitride and silicon nitride. The desired range in size of the electrically conductive material is 90 to 15 microns and finer, and preferably of the order of 50 microns and finer. The boron nitride should preferably be of a size ranging from 20 to 5 microns or smaller.

A convenient method of producing the machinable refractory of the present invention comprises thoroughly homogenizing a mixture of the above specified refractory material, electrically conductive material and boron nitride in the proportions and particle sizes above specified and then forming the mixture into the desired shape by hot pressing the mixture at a temperature of the order of 1900° C. and at a pressure of the order of 400 kg./cm.$^2$. This temperature, however, is not critical and may be varied somewhat depending upon the particular materials used, the proportions thereof, the particle size, the shape of the crucible, and other factors. Temperatures ranging from 1500 to 1900° C. and pressures ranging from 50 to 400 kg./cm.$^2$ have been found to give satisfactory results.

The refractory articles prepared in accordance with the present invention, in addition to being readily machinable with conventional equipment, have shown in commercial practice a useful life of at least 50% greater when used in the form of crucibles than that of the best previously available crucibles.

The following specific examples are given to illustrate further the improved machinable refractory articles of the present invention. It will be understood, however, that both the specific ingredients, the amounts thereof, and the method of producing refractory articles therefrom may be varied within the limits set forth above. Any such variations obvious to one skilled in the art and which do not depart from the basic concept of the invention set forth herein are intended to come within the scope of the appended claims.

EXAMPLE I

A thoroughly homogenized mixture of 27%, by weight, of aluminum nitride, 63%, by weight, of titanium boride and 10%, by weight, of boron nitride, the titanium boride being of a particle size of 50 microns and finer and the particle size of the aluminum nitride being 15 microns and smaller and that of the boron nitride being 20 microns and smaller, was hot-pressed by conventional means and equipment at a temperature of approximately 1800° C. and a pressure of approximately 200 kg./cm.$^2$. The machinability was found to be materially improved by the incorporation of the boron nitride. The hot-pressed article, in the form of a crucible, was found to be eminently satisfactory for the vaporization of aluminum and other metals including copper, silver, gold, rubidium, caesium, beryllium, magnesium, calcium, strontium, barium, gallium, indium, potassium, lanthanum, silicon, germanium, tin, lead, arsenic, antimony, bismuth, chromium, selenium, tellerium, manganese, and the like, and to be free from the disadvantages of the prior art crucibles used for this purpose. They were found to give satisfactory operating results for, on an average, 50% longer operating time than the best commercially known crucibles used for such purposes and at the same time to require less energy consumption than previous types of evaporation crucibles.

EXAMPLE II

A mixture of 60%, by weight, of aluminum boride, 25%, by weight, of titanium carbide and 15%, by weight, of boron nitride, the aluminum boride being of a particle size of 40 microns or finer, the titanium carbide being of a particle size of 50 microns or finer, and the boron nitride being of a particle size of 10 microns or finer, was hot-pressed in a boron nitride form under a pressure of 100 kg./cm.$^2$, within the above specified temperature range to produce sintered geometrical shapes of desired form. The machinability of the shapes was appreciably improved by the incorporation of the boron nitride. The products thus produced were less expensive and more easily produced than those produced by prior art methods.

EXAMPLE III

A mixture of 55%, by weight, of zinc boride having a particle size of 40 microns or smaller, 25%, by weight, of aluminum nitride having a particle size of 10 microns or smaller and 20%, by weight, of boron nitride having a particle size of 10 microns and finer, was subjected to hot-pressing in a graphite mold under a pressure of 100 kg./cm.$^2$, at a temperature within the range above specified to produce machinable geometric forms of desired size and shape. The products thus formed were found to be less expensive, more practical to use and readily machinable.

Similar experiments were carried out, with similar results, using varying mixtures of aluminum boride with various electrically conductive materials listed above, and similarly with silicon nitride with the various electrically conductive materials listed above.

It is understood also that the new refractory materials of the present invention can be used for any purpose where refractory articles of similar properties are required.

What is claimed is:

1. A shaped sintered refractory material of increased machinability comprising a homogeneous mixture containing 10–20%, by weight, of boron nitride with 20–80%, by weight, of the remainder of the mixture being selected from the group consisting of aluminum nitride, aluminum boride and silicon nitride, and 80–20%, by weight, of said remainder of the mixture being selected from the group consisting of graphite, boron carbide, titanium carbide, zirconium carbide, chromium carbide, silicon carbide, titanium boride, zirconium boride, chromium boride, silicon boride, beryllium boride, magnesium boride and calcium boride.

2. A formed refractory article of increased machinability according to claim 1, consisting essentially of a homogeneous mixture of 27%, by weight, of aluminum nitride, 63%, by weight, of titanium boride, and 10%, by weight, of boron nitride.

3. The method of producing shaped machinable refractory articles, which comprises heating to temperatures ranging from about 1500° to about 1900° C., and at pressures ranging from about 50 to 400 kg./cm.$^2$ a homogeneous mixture containing 10–20%, by weight, of boron nitride having a particle size ranging from 20 to 5 microns and smaller, and 20–80%, by weight of the remainder of the mixture being selected from the group consisting of aluminum nitride, aluminum boride and silicon nitride having a particle size ranging from 40 to 5 microns and smaller, and 80–20%, by weight, of said remainder of the mixture being selected from the group consisting of graphite, boron carbide, titanium carbide, zirconium carbide, chromium carbide, silicon carbide, titanium boride, zirconium boride, chromium boride, silicon boride, beryllium boride, magesium boride and calcium boride, having a particle size ranging from 90 to 15 microns and finer, and pressing said heated mix to produce sintered geometric shapes of desired form and size.

4. An electrically conductive refractory body consisting essentially of an admixture of aluminum nitride, boron nitride and titanium boride.

5. An evaporating boat for the vacuum deposition of metals consisting essentially of an admixture of aluminum nitride, boron nitride and titanium boride.

6. In a method for vacuum depositing aluminum from an evaporating boat, the improvement which comprises passing electric current through a heatable evaporating boat composed essentially of an admixture of aluminum nitride, boron nitride and titanium boride.

References Cited
UNITED STATES PATENTS

| | | | |
|---|---|---|---|
| 3,108,887 | 10/1963 | Lenie et al. | 106—65 |
| 3,236,663 | 2/1966 | Grulke et al. | 106—65 |
| 3,251,700 | 5/1966 | Mandorf | 106—65 |
| 3,256,103 | 6/1966 | Roche et al. | 106—65 |
| 3,408,312 | 10/1968 | Richards et al. | 106—65 |

DOUGLAS J. DRUMMOND, Primary Examiner

U.S. Cl. X.R.

106—55, 65; 117—107